(12) United States Patent
Versteeg et al.

(10) Patent No.: US 7,742,407 B2
(45) Date of Patent: Jun. 22, 2010

(54) QUALITY OF SERVICE MANAGEMENT IN A SWITCHED DIGITAL VIDEO ENVIRONMENT

(75) Inventors: William C. Versteeg, Alpharetta, GA (US); William E. Wall, Atlanta, GA (US); Luis A. Rovira, Atlanta, GA (US); David B. Alsobrook, Lawrenceville, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 805 days.

(21) Appl. No.: 11/164,102

(22) Filed: Nov. 10, 2005

(65) Prior Publication Data

US 2007/0104226 A1    May 10, 2007

(51) Int. Cl.
*H04J 3/16* (2006.01)
*H04N 7/173* (2006.01)

(52) U.S. Cl. .................... 370/230; 370/468; 725/96; 725/114

(58) Field of Classification Search ......... 370/229–232, 370/252, 253, 464, 465, 468; 725/37, 59, 725/74, 78, 82, 105, 114, 116, 117, 95, 96
See application file for complete search history.

(56) References Cited

U.S. PATENT DOCUMENTS

| | | | |
|---|---|---|---|
| 5,572,347 A | 11/1996 | Burton et al. | |
| 5,594,509 A | 1/1997 | Florin et al. | |
| 5,600,663 A | 2/1997 | Ayanouglu et al. | |
| 5,633,683 A | 5/1997 | Rosengren et al. | |
| 5,699,365 A | 12/1997 | Klayman et al. | |
| 5,699,369 A | 12/1997 | Guha | |
| 5,790,546 A | 8/1998 | Dobbins et al. | |
| 5,793,436 A | 8/1998 | Kim | 348/497 |
| 5,808,662 A | 9/1998 | Kinney et al. | 348/14.1 |
| 5,815,145 A | 9/1998 | Matthews, III | 725/41 |
| 5,913,031 A | 6/1999 | Blanchard | |
| 5,949,795 A | 9/1999 | Moroney et al. | |
| 6,016,166 A | 1/2000 | Huang et al. | 348/515 |
| 6,118,498 A | 9/2000 | Reitmeier | |
| 6,173,115 B1 | 1/2001 | Willis | 386/125 |
| 6,252,849 B1 | 6/2001 | Rom et al. | |
| 6,278,716 B1 | 8/2001 | Rubenstein et al. | |

(Continued)

FOREIGN PATENT DOCUMENTS

EP    0 714 192    5/1996

(Continued)

OTHER PUBLICATIONS

U.S. Appl. No. 11/164,115, filed Nov. 10, 2005, Entitled "Atomic Channel Changes in a Switched Digital Video System," Inventors: William C. VerSteeg, et. al.

(Continued)

*Primary Examiner*—Steven H Nguyen
*Assistant Examiner*—Kerri M Rose
(74) *Attorney, Agent, or Firm*—Merchant & Gould (57) ABSTRACT

Quality of service management in a switched digital video environment. The devices in a user's home can be given quality of service priority statuses by a system operator. In the event of oversubscription, the quality of service management allows the user to determine which services will have priority over others if more bandwidth is requested than available.

18 Claims, 9 Drawing Sheets

U.S. PATENT DOCUMENTS

| | | | |
|---|---|---|---|
| 6,307,839 B1 | 10/2001 | Gerszberg et al. | 370/235 |
| 6,453,471 B1 | 9/2002 | Klosterman | |
| 6,480,541 B1 | 11/2002 | Girod et al. | |
| 6,510,553 B1 | 1/2003 | Hazra | 725/87 |
| 6,594,798 B1 | 7/2003 | Chou et al. | |
| 6,628,301 B1 | 9/2003 | Acton et al. | |
| 6,665,751 B1 | 12/2003 | Chen et al. | 710/52 |
| 6,701,528 B1 | 3/2004 | Arsenault et al. | 725/89 |
| 6,763,019 B2 | 7/2004 | Mehta et al. | 307/252 |
| 6,973,667 B2 | 12/2005 | Fritsch | 725/8 |
| 7,017,102 B1 | 3/2006 | Kristensson et al. | |
| 7,054,643 B2 | 5/2006 | Trossen et al. | 455/454 |
| 7,065,779 B1 | 6/2006 | Crocker et al. | |
| 7,073,117 B1 | 7/2006 | Ireland et al. | |
| 7,096,481 B1 | 8/2006 | Forecast et al. | 725/32 |
| 7,113,484 B1 | 9/2006 | Chapman et al. | |
| 7,114,172 B2 | 9/2006 | Lord | 725/80 |
| 7,228,356 B2 | 6/2007 | Nguyen et al. | 709/231 |
| 7,266,127 B2 | 9/2007 | Gupta et al. | 370/413 |
| 7,281,058 B1 | 10/2007 | Shepherd et al. | 709/238 |
| 7,433,946 B2 | 10/2008 | Shen et al. | |
| 7,447,978 B2 | 11/2008 | Hannuksela | |
| 7,584,404 B2 | 9/2009 | Kozintsev et al. | 714/776 |
| 7,610,606 B2 | 10/2009 | Carlucci et al. | 725/95 |
| 2001/0025378 A1* | 9/2001 | Sakamoto et al. | 725/114 |
| 2002/0019853 A1* | 2/2002 | Vange et al. | 709/207 |
| 2002/0056107 A1 | 5/2002 | Schlack et al. | 725/46 |
| 2002/0057367 A1 | 5/2002 | Baldock | 348/554 |
| 2002/0067909 A1 | 6/2002 | Iivonen | 386/88 |
| 2002/0129129 A1 | 9/2002 | Bloch et al. | 709/220 |
| 2002/0181454 A1 | 12/2002 | Norman et al. | |
| 2002/0199203 A1 | 12/2002 | Duffy et al. | |
| 2003/0007212 A1 | 1/2003 | Sala et al. | |
| 2003/0007507 A1 | 1/2003 | Rajwan et al. | |
| 2003/0007724 A1 | 1/2003 | Gummalla et al. | 385/24 |
| 2003/0014752 A1 | 1/2003 | Zaslavsky et al. | 725/40 |
| 2003/0048808 A1 | 3/2003 | Stahl et al. | 370/487 |
| 2003/0133458 A1 | 7/2003 | Sato et al. | 370/395.6 |
| 2003/0156218 A1 | 8/2003 | Laksono | |
| 2003/0159143 A1 | 8/2003 | Chan | |
| 2003/0188253 A1 | 10/2003 | Kauschke et al. | |
| 2003/0188311 A1 | 10/2003 | Yuen et al. | 725/42 |
| 2003/0196211 A1 | 10/2003 | Chan | |
| 2003/0200551 A1 | 10/2003 | Kang | 725/120 |
| 2003/0217365 A1 | 11/2003 | Caputo | 725/95 |
| 2004/0111470 A1 | 6/2004 | Poulsen et al. | 709/204 |
| 2004/0133907 A1* | 7/2004 | Rodriguez et al. | 725/14 |
| 2004/0184776 A1 | 9/2004 | Inoue et al. | 386/83 |
| 2004/0194147 A1 | 9/2004 | Craven et al. | 725/111 |
| 2004/0204945 A1 | 10/2004 | Okuda et al. | 704/500 |
| 2004/0226044 A1 | 11/2004 | Goode | 725/95 |
| 2004/0228277 A1* | 11/2004 | Williams | 370/230 |
| 2004/0260814 A1 | 12/2004 | Budge et al. | 709/227 |
| 2005/0166242 A1 | 7/2005 | Matsumoto et al. | 725/88 |
| 2005/0190781 A1 | 9/2005 | Green et al. | |
| 2005/0204251 A1 | 9/2005 | Moon et al. | |
| 2005/0228892 A1 | 10/2005 | Riley et al. | |
| 2005/0289618 A1* | 12/2005 | Hardin | 725/95 |
| 2005/0289623 A1 | 12/2005 | Midani et al. | |
| 2006/0013247 A1* | 1/2006 | Koch et al. | 370/437 |
| 2006/0074968 A1 | 4/2006 | Gyetko | 707/102 |
| 2006/0080707 A1 | 4/2006 | Laksono | |
| 2006/0236358 A1 | 10/2006 | Liu et al. | 725/117 |
| 2006/0242240 A1 | 10/2006 | Parker et al. | |
| 2007/0044130 A1 | 2/2007 | Skoog | 725/110 |
| 2007/0098015 A1 | 5/2007 | Eijsberg | 370/468 |
| 2007/0106782 A1 | 5/2007 | Versteeg | |
| 2007/0107023 A1 | 5/2007 | Versteeg | |
| 2007/0107024 A1 | 5/2007 | Versteeg | |
| 2007/0130393 A1 | 6/2007 | Versteeg | |
| 2007/0186228 A1 | 8/2007 | Ramaswamy et al. | 725/14 |
| 2007/0192812 A1 | 8/2007 | Pickens et al. | 725/94 |
| 2007/0220577 A1 | 9/2007 | Kongalath | |
| 2007/0261087 A1 | 11/2007 | Denney et al. | 725/95 |
| 2008/0008167 A1 | 1/2008 | Versteeg | |
| 2008/0022190 A1 | 1/2008 | Versteeg | |
| 2008/0022320 A1 | 1/2008 | Versteeg | |
| 2008/0028279 A1 | 1/2008 | Versteeg | |
| 2008/0028280 A1 | 1/2008 | Versteeg | |
| 2008/0109692 A1 | 5/2008 | Versteeg | |
| 2008/0134005 A1 | 6/2008 | Izzat et al. | |
| 2008/0229379 A1 | 9/2008 | Akhter | 725/139 |
| 2008/0244667 A1 | 10/2008 | Osborne | |
| 2008/0244679 A1 | 10/2008 | Sukumar | |
| 2009/0007199 A1 | 1/2009 | La Joie | |
| 2009/0031342 A1 | 1/2009 | Versteeg | |
| 2009/0031392 A1 | 1/2009 | Versteeg | |
| 2010/0046634 A1 | 2/2010 | Dai et al. | 375/240.25 |

FOREIGN PATENT DOCUMENTS

| | | |
|---|---|---|
| EP | 1294193 | 3/2003 |
| EP | 1 335 521 A2 | 8/2003 |
| EP | 1 684 450 | 10/2004 |
| EP | 1 589 706 | 10/2005 |
| WO | WO 99/09741 | 2/1999 |
| WO | WO 2005/020556 | 3/2005 |
| WO | WO 2006/019505 | 2/2006 |
| WO | WO 2006/061765 | 6/2006 |
| WO | WO 2007/111693 A2 | 10/2007 |
| WO | WO 2007/111695 | 10/2007 |
| WO | WO 2007/111697 A2 | 10/2007 |
| WO | WO 2007/120260 A2 | 10/2007 |
| WO | WO 2007/120261 A2 | 10/2007 |
| WO | WO 2008/006011 A2 | 1/2008 |
| WO | WO 2008/006012 A2 | 1/2008 |
| WO | WO 2008/006013 A2 | 1/2008 |
| WO | WO 2008/006014 A2 | 1/2008 |
| WO | WO 2008/048828 A2 | 4/2008 |
| WO | WO 2008/118678 A2 | 10/2008 |
| WO | WO 2008/121545 A2 | 10/2008 |

OTHER PUBLICATIONS

U.S. Appl. No. 11/164,119, filed Nov. 10, 2005, Entitled "Bandwidth Management in Each Network Device in a Switched Digital Video Environment," Inventors: William C. VerSteeg, et. al.

U.S. Appl. No. 11/164,147, filed Nov. 11, 2005, Entitled "Expedited Digital Signal Decoding," Inventor: William C. VerSteeg.

U.S. Appl. No. 11/428,336, filed Jun. 30, 2006, Entitled "Systems and Methods of Synchronizing Media Streams," Inventor: William C. VerSteeg.

U.S. Appl. No. 11/691,565, filed Mar. 27, 2007, entitled "Bandwidth Sensitive Switched Digital Video Content Delivery," Inventor: Jason C. Osborne.

U.S. Appl. No. 11/692,457, filed Mar. 28, 2007, entitled "Switched Digital Video Client Reverse Channel Traffic Reduction," Inventor(s): Kanthimathi Gayatri Sukumar, et al.

U.S. Appl. No. 11/550,441, filed Oct. 18, 2006, Entitled "Reducing Channel Change Time," Inventor: William C. VerSteeg.

U.S. Appl. No. 11/829,255, filed Jul. 27, 2007, Entitled "Systems and Methods of Differentiated Channel Change Behavior," Inventors: William C. VerSteeg, et al.

U.S. Appl. No. 11/829,274, filed Jul. 27, 2007, Entitled "Systems and Methods of Differentiated Requests for Network Access," Inventors: William C. VerSteeg et. al.

Sherer, et al. "Appendix a Low Bandwidth Low Latency Channel Change," U.S. Appl. No. 60/719,146, filed Sep. 21, 2005.

U.S Official Action mailed Jul. 17, 2009 in U.S. Appl. No. 11/164,119, pp. 1-13.

U.S Official Action mailed Jan. 9, 2009 in U.S. Appl. No. 11/164,119, pp. 1-13.

U.S Official Action mailed Aug. 3, 2009 in U.S. Appl. No. 11/164,115, pp. 1-13.

U.S Official Action mailed Feb. 19, 2009 in U.S. Appl. No. 11/164,115, pp. 1-12.
U.S Official Action mailed Sep. 3, 2008 in U.S. Appl. No. 11/164,115, pp. 1-11.
U.S Official Action mailed Aug. 5, 2009 in U.S. Appl. No. 11/164,110, pp. 1-9.
U.S Official Action mailed Jan. 8, 2009 in U.S. Appl. No. 11/164,110, pp. 1-8.
U.S Official Action mailed Jul. 11, 2008 in U.S. Appl. No. 11/164,110, pp. 1-6.
Shoaf et al. "IGMP Capabilities in Broadband Network Architectures", Whitepaper Juniper Networks, Mar. 1, 2005, pp. 1-25, XP002999116, pp. 1-31.
Cain et al.: "Internet Group Management Protocol, Version 3; rfc3376.txt" IETF Standard, Internet Engineering Task Force, IETF, CH, Oct. 1, 2002, XP015009135, ISSN: 000-0003, pp. 1-47.
PCT Search Report dated Jul. 15, 2008, PCT/US2006/060695, pp. 1-5.
Jean-Louis Gauvreau, et al.: Optimal Coding Rate of Punctured Convolutional Codes in Multiservice Wireless Cellular Systems: IEEE Transactions on Vehicular Technology, IEEE, Service Center, Piscataway, NJ, vol. 48, No. 1, Jan. 1999, XP011063794, p. 117.
De M Cordeiro C. et al., "Establishing a Trade-off Between Unicast and Multicast Retransmission Modes for Reliable Multicast Protocols." Modeling Analysis and Simulation of Computer and Telecommunication Systems, Aug. 29, 2000, pp. 85-91, XP010515402.
Gemmell, Jim. "Scalable Reliable Multicast Using Erasure-Correcting Re-sends." Microsoft Research, Technical Report MSR-TR-97-20, [Online] Jun. 30, 1997, pp. 1-15, XP002461839.
Lee, Min Jeong et al. "Peformance Improvements of Wireless IP Multicast Conference System based on Designated Receivers," IEEE International Conference on Atlanta, GA, USA, vol. 2, Jun. 7-11, 1998, pp. 807-811, XP010284688.
Nonnemacher, J. et al. "Parity-Based Loss Recovery for Reliable Multicast Transmission." IEEE/ACM Transactions on Networking, vol. 6, No. 4, Aug. 1998, pp. 349-361, XP000771969.
Paul, Sanjoy et al. "Reliable Multicast Transport Protocol (RMTP)" IEEE Journal on Selected Areas in Communications, vol. 15, No. 3, Apr. 1997, XP011054624.
Rizzo, Luigi et al. "RMDP: An FEC-based Reliable Multicast Protocol for Wireless Environments." Mobile Computing and Communications Review, vol. 2, No. 2, Apr. 1998, pp. 23-31, XP000738504.
Kemdore, R.G. "Scoped Hybrid Automatic Repeat reQuest with Forward Error Correction (SHARQFEC)." Computer Communication Review, ACM, New York, NY, vol. 28, No. 4, Oct. 1998, pp. 278-289, XP000914442.
Lacher, M.S., et al. "Performance Comparison of Centralized Versus Distributed Error Recovery for Reliable Multicast." IEEE/ACM Transactions on Networking, IEEE/ACM, New York, NY, vol. 8, No. 2, Apr. 2000, XP011038850.
Liu Wenjie et al.: "Prioritized admission strategy in a clustered video-on-demand system", IEEE Tencon' 02. 2002 IEEE Region 10 Conference on Computers, Communications, Control and Power Engineering Proceedings. Beijing, China, Oct. 28-31, 2002; New York, NY, vol. 1, Oct. 28, 2002, pp. 306-309, XP010628485, ISBN: 978-0-7803-7490-4.
Fitzek et al., "Error Control Teqhniques for Efficient Multicast Streaming in UMTS Networks"; Proceeding of Systemics, Cybernetics and Informatics SCI 2003 [Online] 2003, XP002477506 Orlando, Florida USA. Retrieved from the Internet URL:http//kom.aau.dk/ {ff/documents/SCI_2003.pdf> [retrieved on Apr. 21, 2008] pp. 4-5, figure 4.
Rummler et al., "Performance of Parity-Based Loss Recovery for Reliable Multicast in Third-General Mobile Networks"; Personal, Indoor and Mobile Radio Communications, 2005. PIMRC 2005. IEEE 16th International Symposium on Berlin, Germancy Sep. 11-14, 2005, Piscataway, NJ, USA, IEEE Sep. 11, 2005; pp. 1641-1645, XP010926492.
Rubenstein et al., "Improving Reliable Multicast Using Active Parity Encoding Services"; (APES), 1999, IEEEE, pp. 1248-1255.
"Digital Video Broadcasting (DVB); DVB-H Implementation Guidelines European Broadcasting Union, Union Europeenne de Radio-Television EBUUR; ETSI TR 102 377" ETSI Standards, Lis, vol. BC, No. V1.2.1, Nov. 1, 2005, XP014032216, ISSN: 0000-0001, pp. 27, 59.
Bormans J. et al., "Video coding with H.264/AVC: tools, performance, and complexity" IEEE Circuits and Systems Magazine, IEEE Service Center, New York, NY, US, vol. 4, No. 1, Jan. 1, 2004, pp. 7-28, XP011111220, ISSN: 1531-636X.
Official Action mailed on Mar. 5, 2007, in U.S. Appl. No. 10/080,380, pp. 1-17.
Official Action mailed on Sep. 19, 2007, in U.S. Appl. No. 10/080,380, pp. 1-19.
Official Action mailed on Apr. 8, 2008 in U.S. Appl. No. 10/080,380, pp. 1-14.
Official Action mailed on Dec. 1, 2008 in U.S. Appl. No. 10/080,380, pp. 1-16.
Official Action mailed on Dec. 14, 2007 in U.S. Appl. No. 10/119,700, pp. 1-10.
Official Action mailed on Jul. 1, 2008 in U.S. Appl. No. 10/119,700, pp. 1-13.
Official Action mailed on Nov. 17, 2008 in U.S. Appl. No. 10/119,700, pp. 1-13.
Official Action mailed on Apr. 30, 2009 in U.S. Appl. No. 10/119,700, pp. 1-12.
Official Action mailed on Nov. 24, 2009 in U.S. Appl. No. 10/119,700, pp. 1-13.
Official Action mailed on Nov. 23, 2009, in U.S. Appl. No. 11/164,115, pp. 1-19.
Official Action mailed on Jul. 27, 2009, in U.S. Appl. No. 11/164,147, pp. 1-14.
Official Action mailed on Mar. 18, 2009, in U.S. Appl. No. 11/164,147, pp. 1-15.
Official Action mailed on Sep. 26, 2008, in U.S. Appl. No. 11/164,147, pp. 1-14.
Official Action mailed on Feb. 22, 2008, in U.S. Appl. No. 11/164,147, pp. 1-29.
Official Action mailed on Oct. 20, 2009, in U.S. Appl. No. 11/692,457, pp. 1-18.
Official Action mailed on Apr. 29, 2009, in U.S. Appl. No. 11/692,457, pp. 1-15.
Official Action mailed on Jun. 23, 2009, in U.S. Appl. No. 11/691,565, pp. 1-17.
Official Action mailed on Jun. 23, 2009, in U.S. Appl. No. 11/428,336 pp. 1-23.
Official Action mailed on Feb. 12, 2009, in U.S. Appl. No. 11/428,336 pp. 1-22.
Official Action mailed on Aug. 21, 2008, in U.S. Appl. No. 11/428,336 pp. 1-16.
Official Action mailed on Feb. 2, 2009 in U.S. Appl. No. 11/482,439 pp. 1-15.
Official Action mailed on Jul. 31, 2009 in U.S. Appl. No. 11/482,439, pp. 1-16.
Official Action mailed on Sep. 11, 2009 in U.S. Appl. No. 11/482,437, pp. 1-9.
Official Action mailed on Sep. 18, 2009 in U.S. Appl. No. 11/482,436, pp. 1-11.
Official Action mailed on Sep. 18, 2009 in U.S. Appl. No. 11/482,438, pp. 1-11.
International Search Report dated Oct. 29, 2007, PCT/US2006/060713.
International Search Report dated Dec. 10, 2007, PCT/US2007/072825.
International Search Report dated Dec. 20, 2007, PCT/US2006/060703.
International Search Report dated Dec. 20, 2007, PCT/US2006/060709.
International Search Report dated Jan. 11, 2008, PCT/US2007/072819.
International Search Report dated Feb. 15, 2008, PCT/US2007/072820.
International Search Report dated May 6, 2008, PCT/US2007/072822.
International Search Report dated May 23, 2008, PCT/US2007/080869.

International Search Report dated Jul. 10, 2008, PCT/US08/070851.
International Search Report dated Jul. 10, 2008, PCT/US08/070853.
International Search Report dated Jan. 16, 2008, PCT/US2006/060700.
International Search Report dated Sep. 22, 2008, PCT/US2008/057296.
International Search Report dated Nov. 12, 2008, PCT/US2008/057297.
Written Opinion dated Oct. 29, 2007, PCT/US2006/060713.
Written Opinion dated Dec. 20, 2007, PCT/US2006/060703.
Written Opinion dated Dec. 20, 2007, PCT/US2006/060709.
Written Opinion dated Jan. 16, 2008, PCT/US2006/060700.
Written Opinion dated Feb. 15, 2008, PCT/US2007/072820.
Written Opinion dated May 22, 2008, PCT/US2006/060703.
Written Opinion dated Jul. 10, 2008, PCT/US2008/070851.
Written Opinion dated Jul. 15, 2008, PCT/US2006/060695.
Written Opinion dated Sep. 22, 2008, PCT/US2008/057296.
Written Opinion dated Nov. 12, 2008, PCT/US2008/057297.
Written Opinion dated Apr. 30, 2009, PCT/US2007/080869.
Office Action for EP 06 850 729.2 dated Jan. 27, 2009.
Office Action for EP 07 840 350.8 dated Apr. 28, 2009.
Office Action for EP 07 812 635.6 dated May 6, 2009.
Office Action for EP 06 850 128.7 dated Jul. 18, 2009.
Office Action for EP 07 812 631.5 dated Oct. 2, 2009.
Office Action for EP 07 812 632.3 dated Oct. 23, 2009.
U.S. Appl. No. 10/080,380, filed Feb. 21, 2002, Entitled "Systems and Methods for Generating a Real-Time Video Program Guide Through Video Access of Multiple Channels," Inventor: Peter Chan.
U.S. Appl. No. 10/119,700, filed Apr. 10, 2002, Entitled "Systems, Methods and Apparatuses for Simulated Rapid Tuning of Digital Video Channels," Inventor: Peter Chan.
U.S. Appl. No. 11/164,110, filed Nov. 10, 2005, Entitled "Channel Changes Between Services with Differing Bandwidth in a Switched Digital Video System," Inventors: William C. VerSteeg, et. al.
U.S. Official Action dated Jan. 6, 2010 in U.S. Appl. No. 11/691,565.
U.S. Official Action dated Jan. 14, 2010 in U.S. Appl. No. 11/164,110.
U.S. Official Action dated Jan. 22, 2010 in U.S. Appl. No. 11/164,119.
U.S. Official Action dated Jan. 29, 2010 in U.S. Appl. No. 11/692,457.
U.S. Official Action dated Feb. 19, 2010 in U.S. Appl. No. 11/164,147.
U.S. Official Action dated Feb. 26, 2010 in U.S. Appl. No. 11/482,438.
U.S. Official Action dated Mar. 19, 2010 in U.S. Appl. No. 11/550,441.
International Preliminary Report dated Feb. 2, 2010, PCT/US2008/070851.
International Preliminary Report dated Feb. 2, 2010, PCT/US2008/070853.
Canadian Office Action dated Feb. 8, 2010, Application No. 2,663,907.

* cited by examiner

QUALITY OF SERVICE MANAGEMENT IN A SWITCHED DIGITAL VIDEO ENVIRONMENT

CROSS-REFERENCE TO RELATED PATENT APPLICATIONS

The present U.S. application is related to U.S. applications entitled, "CHANNEL CHANGES BETWEEN SERVICES WITH DIFFERING BANDWIDTH IN A SWITCHED DIGITAL VIDEO SYSTEM" with Ser. No. 11/164,110, "ATOMIC CHANNEL CHANGES IN A SWITCHED DIGITAL VIDEO SYSTEM", and "BANDWIDTH MANAGEMENT IN EACH NETWORK DEVICE IN A SWITCHED DIGITAL VIDEO ENVIRONMENT" with Ser. No. 11/164,119, which are incorporated herein by reference, and have been filed concurrently with the present application.

FIELD OF THE INVENTION

This invention relates in general to broadband communications systems, and more particularly, to the use of a switched digital video system to change between services with the same or differing bandwidths in a local home network.

BACKGROUND

A broadband communications system includes data sources, a broadcasting network, a headend unit, and edge devices. The data sources can be encoders and video sources that send data through an uplink to the broadcasting network. In the broadcasting network, three common types of signals received at the headend include off-air signals, satellite signals, and local origination signals. The satellite signals include any signal transmitted from an earth station to an orbiting satellite which are then retransmitted back down to earth. The signals are transmitted from earth to the orbiting satellite on a path referred to as the uplink. These signals are then received by a transponder on the satellite and are retransmitted from the transponder to a receiving earth station over a downlink. The transponder amplifies the incoming signal and changes its frequency for the downlink journey to avoid interference with uplink signals.

The headend (HE) or central office is where signals from multiple sources are received and are conditioned and prepared for transmission over an access network to subscribers. Once signals have been prepared for delivery, they are combined onto a medium to be sent over the access network to the customer premise devices. Conditioning may include conversion of analog to digital, digital bit-rate conversion, conversion from variable bit rate to constant or clamped bit rate, conversion of multiple-program transport streams to single-program transport streams or any other type of grooming or combination of these. The medium may include coaxial, twisted pair or other cable, optical fiber, or some form of wireless transmission. The preparation for transmission in edge devices may include generation of an RF carrier, modulation, conversion to optical, frequency division multiplexing, time division multiplexing, wavelength division multiplexing or any combination of these. Edge devices vary depending on the type of network, and include the headend output devices. These edge devices sometime overlap with or extend into an access network. The fiber access network can include an optical line terminal (OLT), an optical node terminal (ONT), and devices inside the home. Therefore, the OLT and ONT may be considered either an edge device or an access network device. However, the ONT may at times be considered a customer premises device. A hybrid fiber/coax (HFC) network typically uses modulator edge devices. An HFC access network can include RF to optical converters, optical to RF converters, optical and RF amplifiers, optical and RF combiners, splitters and taps. HFC customer premises devices include RF modems and set-top boxes. A digital subscriber line (DSL) network can include a digital subscriber line access multiplexer (DSLAM). DSL modems are usually located in customer premises. The OLTs, modulators, and DSLAMs, also known as edge devices, service numerous user homes, such as a neighborhood in a city. Customer premise devices can include modems, routers, personal computers, set-top boxes (STB), etc.

Figure 1:
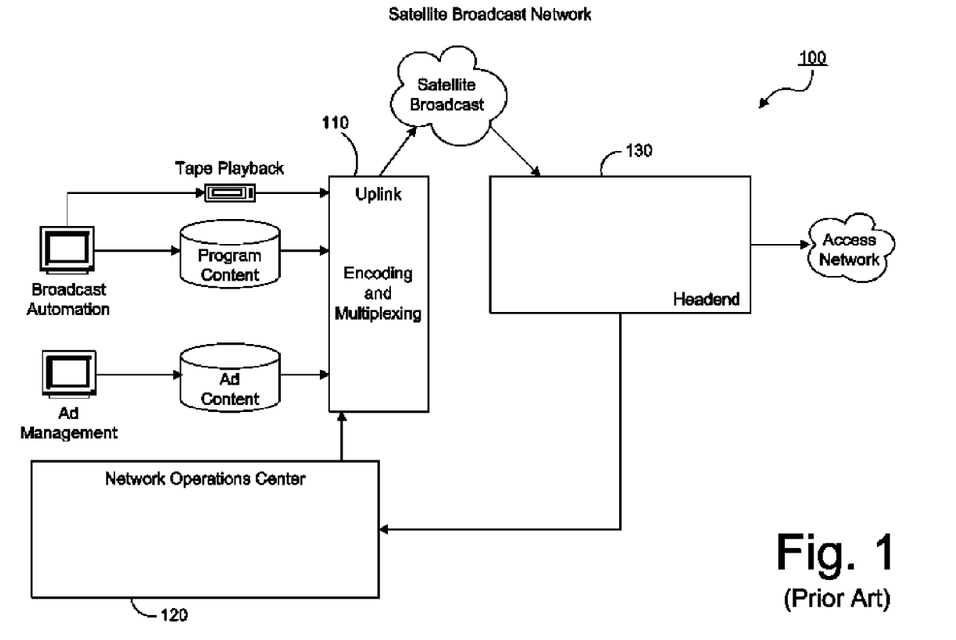
FIG. 1 illustrates a satellite broadcast system with an uplink, headend, and network operations center.

FIG. 1 illustrates a satellite broadcast network 100. At an uplink facility 110, program content is stored on video servers controlled by a broadcast automation system. Any analog content at a network operations center (NOC) 120 is compressed using encoders and then multiplexed with the content delivered from the video file servers. The NOC 120 is responsible for overall control and co-ordination of the uplink and the downlink sites. A headend (HE) 130 may include one or more server devices for providing broadband signals such as video, audio, and/or data signals. The headend 130 also has numerous decoders which preferably each have a mass storage device, such as a hard disk drive.

Broadband communications systems, such as satellite and cable television systems and DSL, are now capable of providing many services in addition to analog broadcast video, such as Video-on-Demand (VOD), digital video recording (DVR), high-definition television (HDTV), interactive TV, TV-based internet access, online gaming, telelearning, video conferencing, voice services, and high speed data services. The growth in available services has outpaced the rate of access network bandwidth increases due to upgrades and rebuilds. This same growth in available services has also created a situation in which most services are not being used at any given time by entire subdivisions of subscribers or customer premise devices. Thus edge device, access network, and customer premise bandwidth is wasted when many of these services are continuously sent to subscribers that are not using them. Switched digital video (SDV) is a technique that recaptures such wasted access network bandwidth by delivering selected services only to homes where and when users are actively requesting service. The switched digital video technique would be performed in the SDV devices, which vary depending on the type of network. A common problem using the SDV technique occurs when devices in a user's home request services requiring more aggregate bandwidth than can be provided. There is no current method to determine which services receive priority over other services when there is not enough available bandwidth.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION

The embodiments of the invention can be understood in the context of a broadband communications system. Note, however, that the invention may be embodied in many different forms and should not be construed as limited to the embodiments set forth herein. For example, transmitted broadband signals may include at least one of video/audio, telephony, data, or Internet Protocol (IP) signals, to name but a few. All examples given herein, therefore, are intended to be non-limiting and are provided in order to help clarify the description of the invention.

A switched digital video system is a method of maximizing the number of services offered using a minimum of bandwidth. The switched digital video system allows chosen services from the HE 130 or central office to continually be sent to the subscriber premises, or the user's home, and other services to be switched in as requested by the user. For example, in a cable television system, a specified group of popular television channels is continually sent to every home in an access network subdivision regardless of what the user may want. When a user requests a channel not in this specified group, it is first checked to see if anyone else in the service group is watching the requested channel. If yes, then the requesting user is given access to the stream already carrying the requested channel. If not, the switch provides the requested stream to the required edge device and the system gives the requesting subscriber access to that stream. A switched digital video system can be used on many types of networks such as fiber, hybrid fiber/coax, and xDSL networks.

Figure 2:
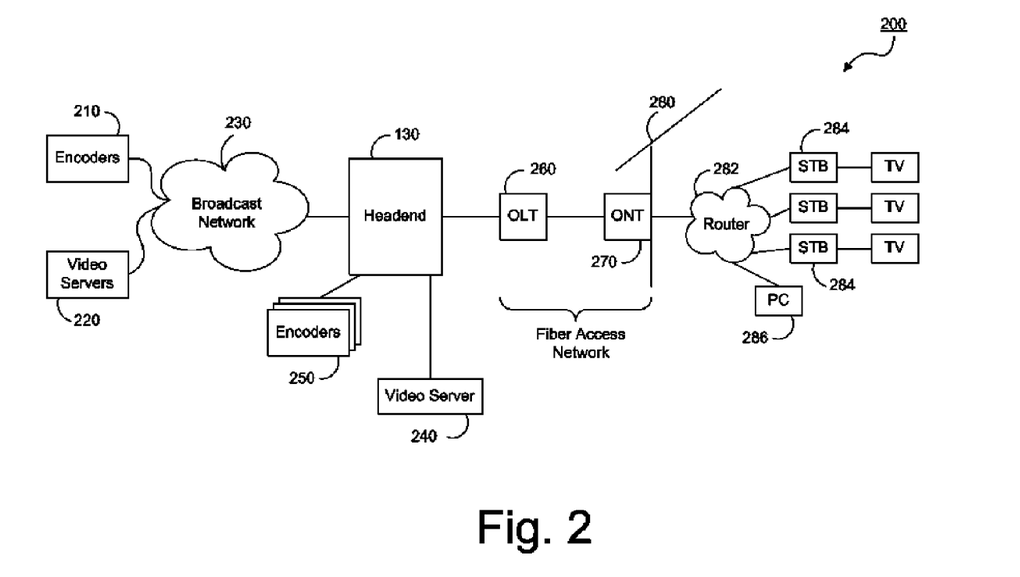
FIG. 2 illustrates the system of FIG. 1 in combination with a fiber access network and a customer premises network.

FIG. 2 illustrates the satellite broadcast system 100 of FIG. 1 in combination with a fiber access network 200 and a customer premises network 280. Encoders 210 and video servers 220 are the data sources that feed a broadcast network 230 of the satellite broadcast system 100. Video servers 240 and encoders 250 located at the HE 130 are used to insert local programming. The HE 130 of the satellite broadcast system 100 receives signals from multiple sources, conditions them and prepares them for transmission over the access network 200. Once signals have been prepared for transmission from the HE 130, they are combined onto the access network media. In a fiber access network 200 an optical line terminal (OLT) 260 transmits downstream to optical network terminals (ONT) 270 which are located outside the customer premises network 280. The OLT 260 is responsible for allocating necessary upstream bandwidths to the ONTs 270 by issuing data grants in an appropriate manner. Inside the customer premises network 280, the signals can be split and combined using a router 282, or other device, and then fed to various devices, such as one or more set-top boxes (STBs) 284 or personal computers (PCs) 286.

Figure 3:
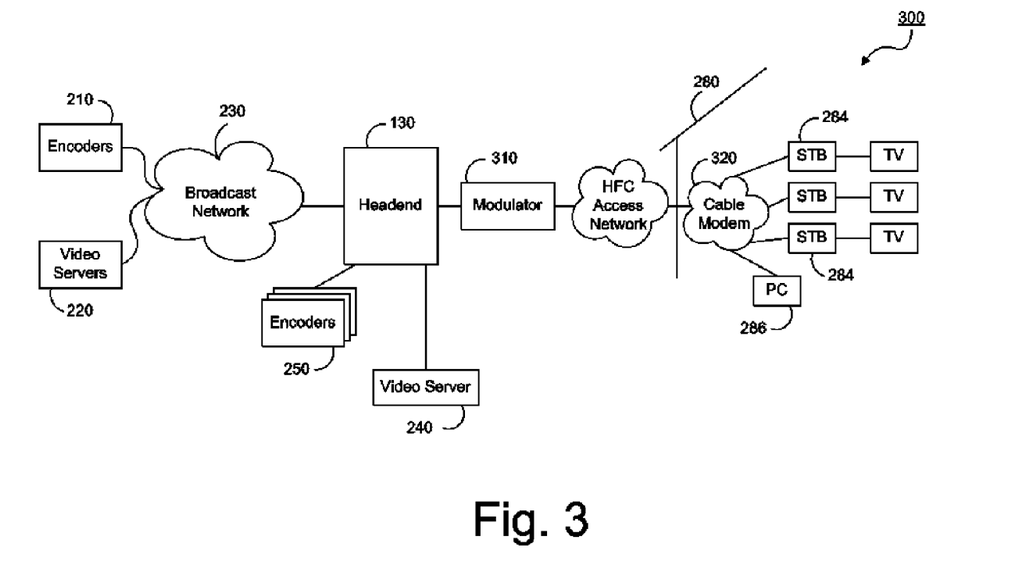
FIG. 3 illustrates the system of FIG. 1 in combination with a hybrid fiber/coax access network and a customer premises network.

FIG. 3 illustrates the satellite broadcast system 100 of FIG. 1 in combination with a hybrid fiber/coax (HFC) access network 300 and the customer premises network 280. The components used for the HFC access network 300 are similar to those used for the fiber access network 200. However, instead of the OLT 260 and the ONT 270, the hybrid fiber/coax network 300 uses an edge modulator 310. Inside the customer premises network 280, the signal is received by a cable modem 320 and sent to various devices, such as one or more STBs 284 or PCs 286. RF STBs may interface to the HFC access network 300 directly using internal modems.

Figure 4:
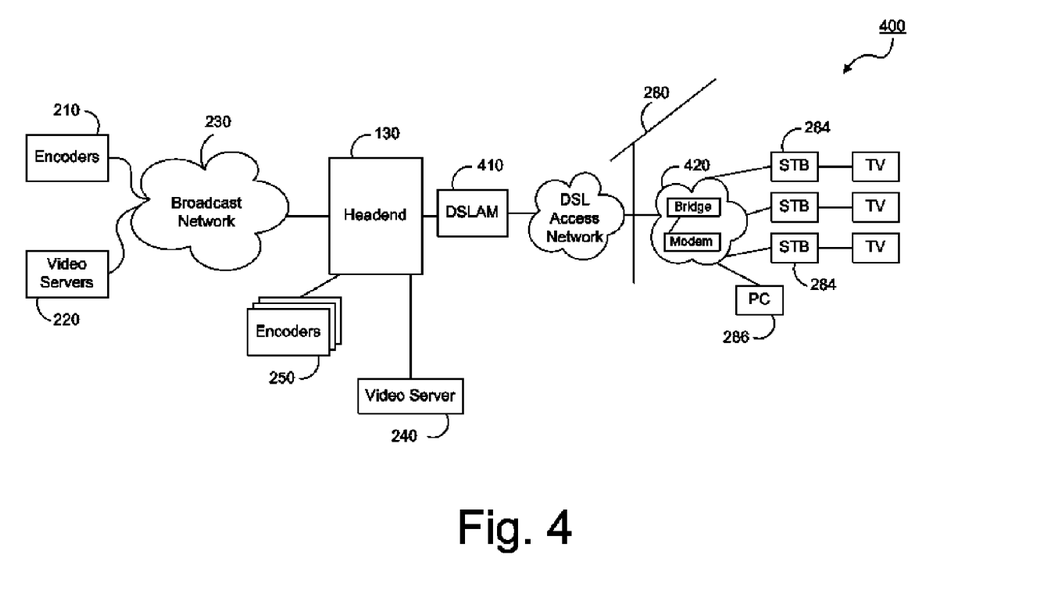
FIG. 4 illustrates the system of FIG. 1 in combination with a DSL access network and a customer premises network.

FIG. 4 illustrates the satellite broadcast system 100 of FIG. 1 in combination with a DSL access network 400 and the customer premises network 280. The components used for the DSL access network 400 are similar to those used in the fiber access network 200 and the HFC access network 300 except for the edge devices. Instead of the OLT 260 and the ONT 270 or the modulator 310, the DSL access network 400 has a digital subscriber line access multiplexer (DSLAM) 410 that links numerous users to a single high-speed ATM line. Inside the customer premises network 280, the signal is received by a local network 420 possibly containing a modem and bridge router. The signal is split there and fed to various devices, such as one or more STBs 284 or PCs 286.

The switched digital video technique would be performed in SDV devices, such as the OLT 260, DSLAM 440, modulator 340 or a router feeding the modulator 340, depending on the type of network. A common problem using the SDV technique occurs when devices in a user's home request services requiring more aggregate bandwidth than can be provided. The SDV devices can not currently track the bandwidth being requested, so an attempt is made to honor all requests. This results in oversubscribing and a loss of packets.

Figure 5:
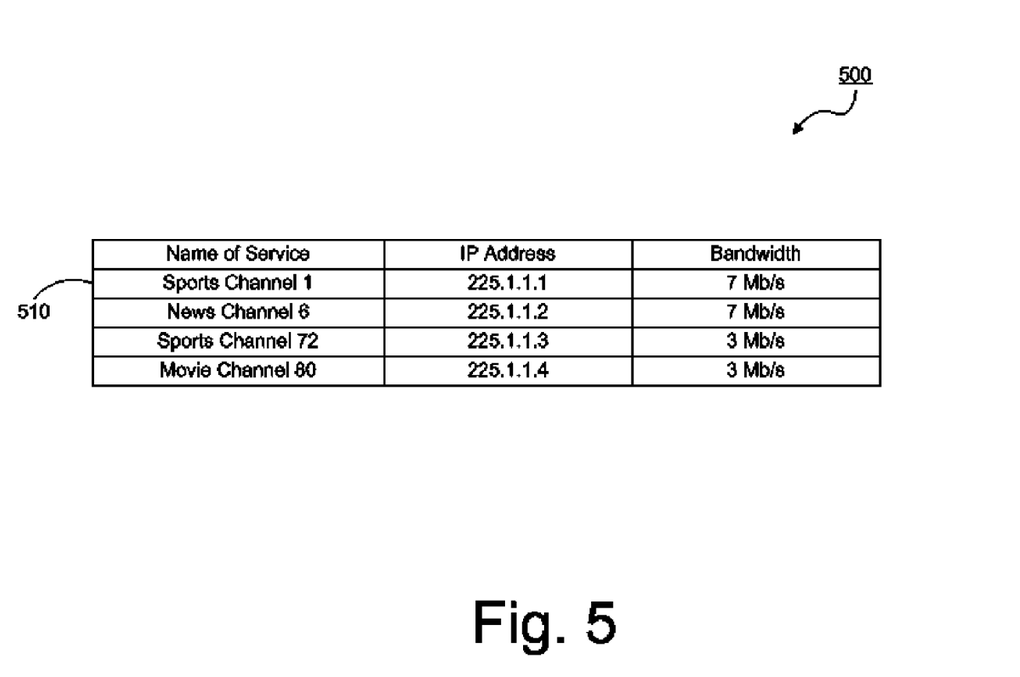
FIG. 5 illustrates a services map published by the headend.
Figure 6:
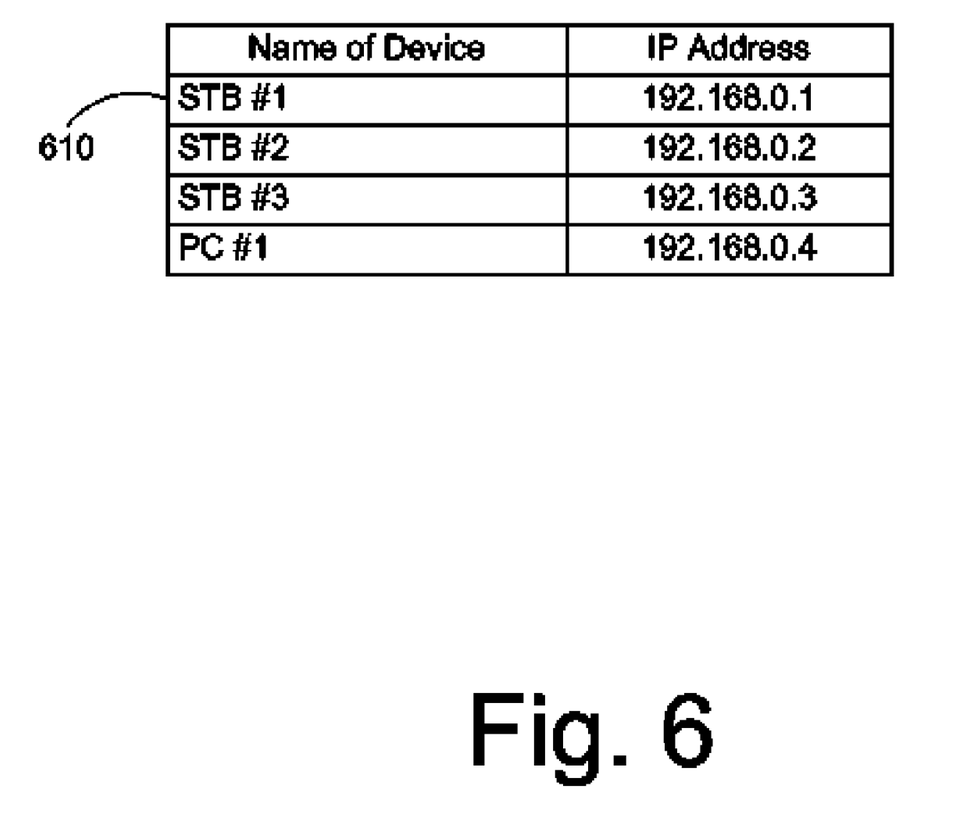
FIG. 6 illustrates a group of STBs and PCs in a home.

When a device in the user's home requests a change in service that will affect the bandwidth required, the change will be subject to a system resource management validation. For SDV devices to evaluate bandwidth requests and availability, the HE 130 can publish a services map 500, as shown in FIG. 5, prepared by the system operator. The map will be put in a multicast group, which is a group of different services, and the STB in the home will know to join the multicast containing the services map first. The STB will then distribute the map to the other devices in the home. As shown in FIG. 6, each SDV device and each device in the home will have an identifier, such as an IP address, which will allow them to differentiate themselves from one another. The devices in the home will use the information in the services map to provide the SDV devices with the requesting IP address and the required bandwidth. For example, STB number 1 with reference number 610 is located at IP address 192.168.0.1 and is tuned to the service "Sports Channel 1" shown as reference number 510 at IP address 225.1.1.1 requiring 7 Mb/s of bandwidth. The SDV devices have the ability to evaluate the request from the devices in the home by comparing the requested bandwidth to the available bandwidth for the subscriber premises. The SDV devices can either grant or deny the service in order to prevent oversubscription and a loss of packets.

In another embodiment, the SDV devices and all the devices in the users' home can correlate a request for service to the bandwidth available to each home. A bandwidth management status is the required bandwidth of a request correlated to the available bandwidth in the home. Each device has its own upper limit or choke point. The SDV devices and the home devices parse the service request packets before sending them upstream and adding their bandwidth management status (the requested bandwidth correlated to the available bandwidth) to the request. If any device does not have adequate bandwidth, it sends a message to the requesting device indicating an error condition.

Internet group management protocol (IGMP) is a standard used to communicate between an IP host, such as the SDV devices, and the neighborhood multicast agents to support allocation of temporary group addresses and the addition and deletion of members of the group. In this embodiment, the bandwidth can be managed by having a field in the IGMP request for adding the bandwidth management status at each intervening point, or at each device. In normal IGMP, only the IGMP endpoint is an active component. In this embodiment, however, the IGMP endpoint, the SDV device, and any of the devices in the user's home can read and evaluate the incoming requests in order to deny or pass on the request upstream.

Figure 7:
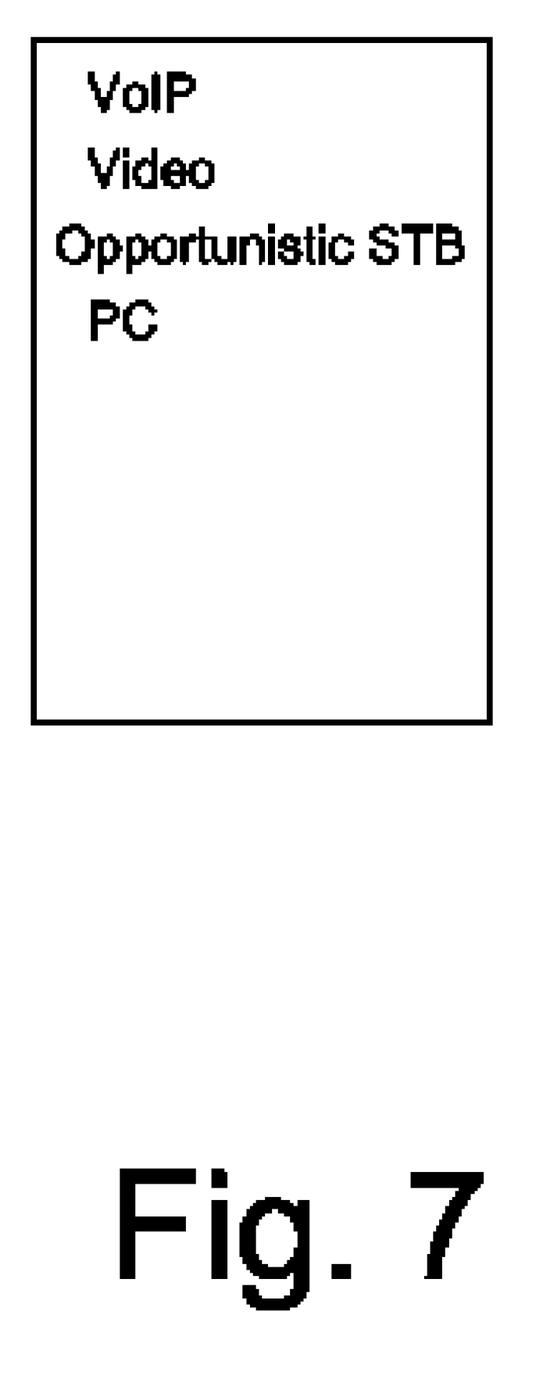
FIG. 7 illustrates a quality of service priority table for services in a user's home.

In the event of oversubscription, it is possible to place a quality of service (QOS) priority status on each request. This QOS priority status scheme is set up by the system operator. As the IGMP request passes from device to device, each device needs to be able to specify the required QOS for the requested stream. For example as shown in FIG. 7, in a multicast group, voice over IP (VOIP) streams may require a higher priority than video which has a higher priority than web surfing, which is an opportunistic STB function.

Figure 8:
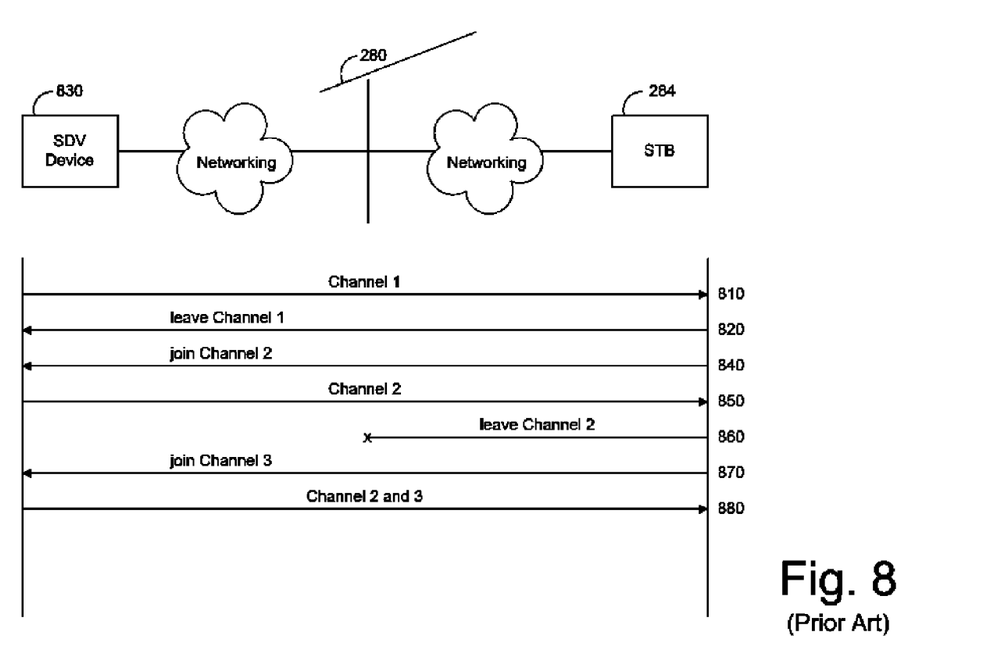
FIG. 8 illustrates the prior art method of IGMP based channel changes in a broadcast system, including an error condition.

FIG. 8 illustrates the current method of IGMP based channel changes in a broadcast system. Joining and leaving multicast groups are currently two independent transactions. The joining message is a request for a new channel and the leaving message is a request to terminate a current channel. For example, if a user is currently watching channel 1, as shown in reference number 810, and wants to watch channel 2, then a channel change must occur. First, a "leave channel 1" transaction 820 is sent to a SDV device 830. Then, a "join channel 2" transaction 840 is also sent to the SDV device 830. Channel 2, shown in reference number 850, is now being sent to a STB 284 in the user's home 280. This is a correct channel change.

Either of these transactions can be dropped by the network. A dropped transaction can lead to oversubscription. For example, if a user wants to change channels from channel 2 to channel 3, a "leave channel 2" transaction 860 is sent to the SDV device 830. If the transaction 860 is dropped, then channel 2 is still being sent to the STB 284. A "join channel 3" transaction 870 is also sent to the SDV device 830. The SDV device 830 will attempt to send both channels 2 and 3, as shown in reference number 880, which will cause an oversubscription.

Figure 9:
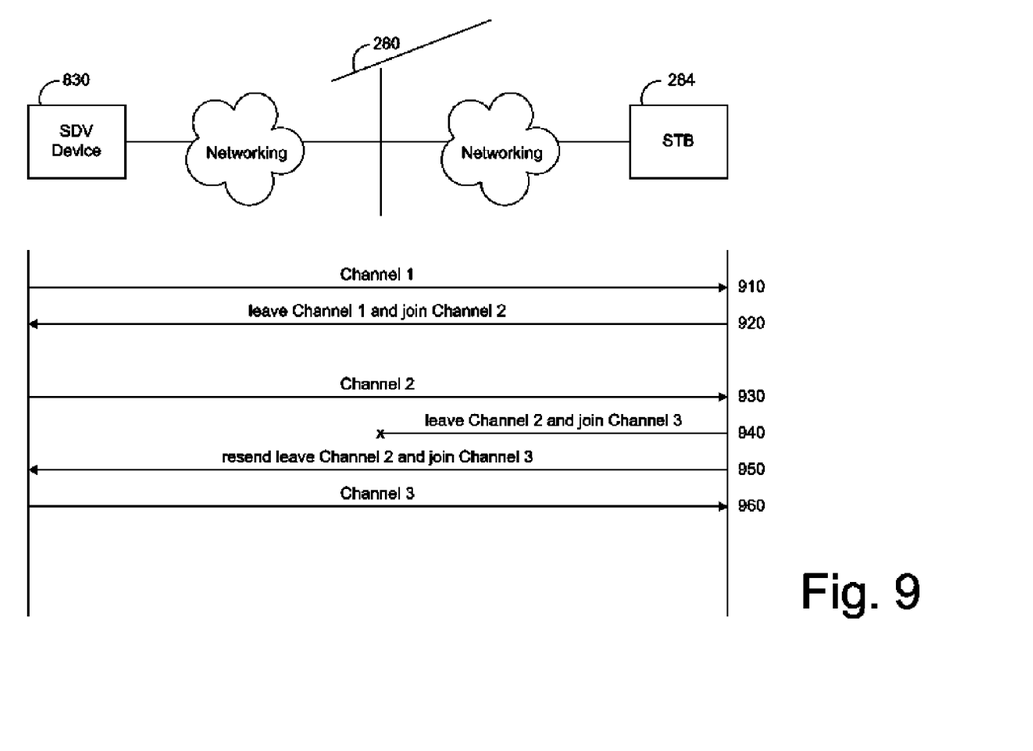
FIG. 9 illustrates a method of atomic channel change in a broadcast system according to the present invention.

FIG. 9 illustrates a method of atomic channel change in a broadcast system according to the present invention. In this embodiment, a new IGMP message is defined that explicitly lists the streams that the STB 284 wants to receive and simultaneously requests a join and leave transaction. For example, if a user is currently watching channel 1, shown in reference number 910, and decides to watch channel 2, then a channel change must occur. The STB 284 sends a message to the SDV device 830 that contains a "leave channel 1 and join channel 2" transaction 920. Channel 2, shown in reference number 930, is now being sent to the STB 284 in the user's home 280. This is a correct channel change. Also, if a user wants to change channels from channel 2 to channel 3, a "leave channel 2 and join channel 3" transaction 940 is sent to the SDV device 830. If the transaction 940 is dropped, then no change occurs and, because STB 284 never received channel 3, the STB 284 resends the "leave channel 2 and join channel 3" in transaction 950. The STB 284 may wait to receive channel 3 for a specified period of time before resending the "leave channel 2 and join channel 3" transaction 950. Alternately, if the user reiterates the channel change request, the STB 284 may resend the "leave channel 2 and join channel 3" transaction 950. The SDV device 830 is now sending channel 3, as shown in reference number 960, to the STB 284.

IGMP messages, such as join and leave messages, can be updated or modified to include bandwidth requirements of both the join and leave channels. For example, channel 1, as shown in reference number 910, may require a bandwidth of 3 Mb/s and channel 2, as shown in reference number 930, may require a bandwidth of 6 Mb/s. The SDV device can compare the available bandwidth in the local network to the required bandwidth for channel 2 before performing the channel change. This would allow the SDV devices to more accurately determine which services can be sent to a user's home without oversubscription occurring and return an error message to the requesting device if service is not possible.

The number of services offered by broadband communications systems continues to grow. With an increase in the number of services offered and the number of users subscribing, the demand for bandwidth has drastically increased. The SDV technique, described above, delivers selected services only to homes where and when users are actively requesting service, which helps to efficiently manage the available bandwidth. To make this more effective, each device in the local network can calculate the available bandwidth versus the bandwidth requested for a service. When oversubscription would occur, the quality of service priority status of each request, which is provided by the user, is consulted. The devices with the highest statuses are given priority bandwidth over the other services.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the embodiments of the invention in logic embodied in hardware and/or software-configured mediums.

What is claimed is:

1. A method of providing a quality of service for a multicast group of devices at a subscriber premises, said method comprising the steps of:

receiving, by a switched digital video device in communication with said multicast group of devices, a priority status in a request for a digital service from at least one of said multicast group of devices in said subscriber premises; and evaluating, by the switched digital video device, said request by comparing bandwidth requirements of said one request to available bandwidth of said subscriber premises, wherein comparing the bandwidth requirements comprises:

parsing a service plurality of service request packets prior to sending the packets upstream to a headend;

adding a bandwidth management status to each of the plurality of service request packets, the bandwidth management status comprising a correlation between a requested bandwidth and the available bandwidth; and sending an error message to the at least one of said multicast group of devices in said subscriber premises that does not have adequate bandwidth.

2. The method of claim 1, further comprising the step of determining there is insufficient available bandwidth to grant both said request and another request received from another device in the multicast group of devices.

3. The method of claim 2, further comprising the step of granting said request if said priority status of said request is higher priority than another request received from another device in the multicast group of devices.

4. The method of claim 2, further comprising the step of denying said request if said priority status of said request is lower priority than another received from another device in the multicast group of devices.

5. The method of claim 1, further comprising the step of ordering said requests from each device in said subscriber premises based upon said priority status of each said request.

6. The method of claim 5, further comprising the step of granting one of said requests if said priority status of said one request is higher than another said request of another device.

7. The method of claim 6, further comprising the step of denying said other request if said priority status of said one request is lower than said other request of another device, and there is insufficient bandwidth to grant both said one request and said other request.

8. A computing device comprising:
a processor executing instructions retrieved from a memory, the instructions operable to:
receive a priority status in a request for a digital service from a device in a multicast group of devices located at a subscriber premises; and
evaluate the request by comparing bandwidth requirements of the request to available bandwidth of the subscriber premises, wherein in comparing the bandwidth requirements, the instructions are operable to:
parse a plurality of service request packets prior to sending the packets upstream to a headend;
add a bandwidth management status to each of the plurality of service request packets, the bandwidth management status comprising a correlation between a requested bandwidth and the available bandwidth; and
send an error message to the at least one of said multicast group of devices in said subscriber premises that does not have adequate bandwidth.

9. The computing device of claim 8, wherein the instructions are further operable to: determine there is insufficient available bandwidth to grant both the request and another request received from another device in the multicast group of devices.

10. The computing device of claim 9, wherein the instructions are further operable to: grant the request if said priority status of the request is higher priority than another request received from another device in the multicast group of devices.

11. The computing device of claim 9, wherein the instructions are further operable to: deny the request if said priority status of the request is lower priority than another request received from another device in the multicast group of devices.

12. A system of providing a quality of service for a multicast group of devices at a subscriber premises, the system comprising a switched digital video device in communication with said multicast group of devices, the switched digital video device being configured to:
receive a priority status in a request for a digital service from at least one of said multicast group of devices in said subscriber premises; and
evaluate said request wherein the switched digital video device being configured to evaluate comprises the switched digital video device being configured to compare bandwidth requirements of said one request to available bandwidth of said subscriber premises, wherein the switched digital video device being configured to compare the bandwidth requirements comprises the switched digital video device being configured to:
parse a service plurality of service request packets prior to sending the packets upstream to a headend;
add a bandwidth management status to each of the plurality of service request packets, the bandwidth management status comprising a correlation between a requested bandwidth and the available bandwidth; and
send an error message to the at least one of said multicast group of devices in said subscriber premises that does not have adequate bandwidth.

13. The system of claim 12, wherein the switched digital video device is further configured to determine that there is insufficient available bandwidth to grant both said request and another request received from another device in the multicast group of devices.

14. The system of claim 13, wherein the switched digital video device is further configured to grant said request if said priority status of said request is higher priority than another request received from another device in the multicast group of devices.

15. The system of claim 13, wherein the switched digital video device is further configured to deny said request if said priority status of said request is lower priority than another received from another device in the multicast group of devices.

16. The system of claim 12, wherein the switched digital video device is further configured to order said requests from each device in said subscriber premises based upon said priority status of each said request.

17. The system of claim 16, wherein the switched digital video device is further configured to grant one of said requests if said priority status of said one request is higher than another said request of another device.

18. The system of claim 17, wherein the switched digital video device is further configured to deny said other request if said priority status of said one request is lower than said other request of another device, and there is insufficient bandwidth to grant both said one request and said other request.

* * * * *